United States Patent Office 2,768,875
Patented Oct. 30, 1956

2,768,875

STABILIZING AQUEOUS SOLUTIONS OF POLY-
THIONATES AND POLYTHIONIC ACIDS

Torben Emil Neesby, New Brunswick, N. J., assignor to
Carroll Dunham Smith Pharmacal Co., a corporation
of New Jersey No Drawing. Application April 18, 1952,
Serial No. 283,125

4 Claims. (Cl. 23—114)

The present invention relates to stabilization of tetra-, penta- and hexa-thionates and more particularly to the stabilization of dilute solutions of the alkali metal and alkaline earth metal salts of these thionates. The invention includes the production of relatively stable pure solutions of these polythionates as well as relatively stable solutions containing these polythionates admixed with other substances.

This application is a continuation-in-part of application Serial No. 793,518, filed December 23, 1947, now abandoned, which is a division of application Serial No. 620,637, filed October 5, 1945, and issued as Patent 2,551,627 on May 8, 1951.

It is known that solutions of polythionates are comparatively unstable in that they decompose with conversion of the polythionates present, partially or completely, into sulfates, sulfites and crystalline sulfur.

Polythionates, as is also well known, have a strong bactericidal effect which renders them particularly useful in cosmetics, for skin treatment and as prophylactic and curative agents for various diseases. However, their instability makes it difficult, if not impractical, to prepare commercial compositions containing them because they soon decompose with consequent (a) loss of effectiveness, (b) discoloration of and (c) imparting of foul odors to the compositions in which they are incorporated.

According to my invention dilute acid solutions of the alkali metal and alkaline earth metal salts of tetra-, penta- and hexa-thionates, the tetra-, penta- and hexa-thionic acids and mixtures of such acids are stabilized by adding to the solutions from 0.001% to 1% by weight based on the weight of the polythionates present in the solution of a cupric or ferric compound which will ionize in the solution to form cupric or ferric ions.

This invention is particularly applicable to the stabilization of acid solutions containing tetra-thionate alone, a mixture of tetra- and penta-thionates, mixtures of penta- and hexa-thionates, mixtures of tetra-, penta- and hexa-thionates, the corresponding free acids and mixtures thereof. Such salt solutions may be prepared, for example, by partially or completely neutralizing tetra-, penta- or hexa-thionic acids employing for this purpose the hydroxide, carbonate or other salt of the desired alkali metal or alkaline earth metal. The partially neutralized solution will contain some free, i. e., non-neutralized, polythionic acid, and consequently will have a pH of below 7, the pH depending on the amount of polythionic acid present. It is preferred to have enough acid present to impart to the solution a pH of below 4, preferably within the range of from 1 to 3 in the case of solutions employed for the treatment of the skin or hair because such acid solutions have been found most efficient. Solutions in which the polythionates are present entirely in the form of the salt and have a pH of near 7 desirably have the pH adjusted to the desired value by addition of acids, such as sulfuric acid, hydrochloric acid and preferably a polythionic acid. 2% solutions containing only the free acids have a pH below 1 usually about 0.7.

Solutions of polythionates may also be prepared by dissolving directly the alkali metal or alkaline earth metal polythionates (tetra-, penta- or hexa- or mixtures of these polythionates) in the solvent. Desirably, the solution thus formed is filtered to remove any suspended material, the pH adjusted to the desired value depending upon the intended use, and the solution stabilized in accordance with this invention.

The concentration of the solution stabilized may be in the range of from 0.1% to 10% by weight, preferably from 2% to 5% by weight of polythionate and/or polythionic acid. This range represents the commercially important range of concentration of dilute solutions which present a practical stability problem. Employing a mixture of tetra- and penta-polythionates from 1 to 3 parts of the tetra compound may be mixed with from 3 to 1 parts of the penta compound. The hexa compound when used in admixture with the tetra and penta, desirably is mixed in the proportion from from 1 to 3 hexa to from 1 to 3 penta and from 1 to 3 tetra, if the latter is also employed. When stabilizing a solution of the hexathionate in accordance with this invention, the pH of the solution is adjusted to a value preferably below 1 or substantial concentrations of other polythionates are introduced.

As the alkali metal salts sodium, potassium and lithium salts are preferred, particularly the potassium salt. The calcium and magnesium salts are the preferred alkaline earth metal polythionates.

The solvent for the polythionates or polythionic acids may be water alone or methanol and ethanol water mixtures containing up to 55% of the alcohol when the tetra polythionate is the solute and as high as 80% of the alcohol when the penta or hexa or a mixture of these two polythionates are the solutes. A propylene glycol water mixture containing up to 50% propylene glycol may also be used as the solvent.

The amount of stabilizer added to the solution should preferably be from 0.001% to 1% based on the weight of the polythionates and/or polythionic acid in the solution. In general, the lower the pH of the solution to be stabilized, the less stabilizer required. Accordingly, an amount of stabilizer within the lower portion of the range should be used for stabilizing solutions having a pH of 4 or less. For solutions having a pH within the range of 1 to 3 from 0.01% to 1%, preferably from 0.01% to 0.1%, stabilizer will be found adequate.

As the stabilizer cupric or ferric formate, citrate, tartrate or acetate, cupric or ferric carbonate, cupric or ferric sulfate, cupric or ferric nitrate, cupric or ferric hydroxide and other cupric or ferric salts sufficiently soluble in the solvent to furnish cupric or ferric ions may be used in the amount above given.

The temperature at which the stabilized solution is prepared and stored is not critical. Since elevated temperatures tend to increase the rate of decomposition of the polythionate they should be avoided. Preparation and storage of the stabilized solutions at atmospheric temperature will generally be found most convenient.

The solution to be stabilized is preferably treated, for example, by blowing air therethrough to remove any sulfur dioxide which might be present. The presence of sulfur dioxide is harmful in that the sulfur dioxide may react with either the stabilizer or the polythionate, which reaction results in the precipitation of the stabilizer.

While the explanation for the stabilizing effect of the small amounts of the stabilizers hereinabove disclosed is not fully understood, it is believed that the stabilizers oxidize the thiosulfates and sulfites formed upon decomposition of the polythionates and polythionic acids, to produce tetrathionates and sulfates, respectively. Tetrathionates and sulfates do not exercise any catalytic effect on the formation of thiosulfates and sulfites from polythionates (which expression is used herein to include polythionic acids wherever the context so permits). Hence, the presence of the stabilizers functions to convert thiosulfates and sulfites formed upon decomposition of polythionates to compounds which do not favor or cause further decomposition of polythionates and thus tend to arrest further decomposition. In the absence of the stabilizers of this invention the thiosulfates and sulfites produced upon decomposition of the polythionates catalyze this decomposition causing the formation of more thiosulfates and sulfites with consequent promotion of the substantially complete decomposition of the polythionates.

From my research work, which establishes that small amounts of stabilizers, as little as 0.001% based on the weight of the polythionates present, actually stabilize dilute polythionate solutions for relatively long periods of time, two weeks and longer in the case of dilute solutions having a pH of 1 to 3, it is clear that the stabilizers do not react with the polythionates or polythionic acids to form cupric or ferric salts, but otherwise exercise their stabilizing influence, probably as hereinabove explained. It will be understood that this invention is not to be limited to the above theory or explanation of how the stabilizer functions to minimize decomposition of the polythionates.

The following examples of the invention are given for purposes of illustration only. It will be understood this invention is not limited to these examples.

In some of the examples the test procedure followed to demonstrate the stability of the solutions involved maintaining the solution of the example and a comparative sample of the solution, which sample differed from the example only in the omission of the stabilizer, at a temperature of 50° C. for the stated period of time. Thereafter both solutions were inspected and the polythionate concentration ascertained. Solutions which show little loss of polythionate concentration at temperatures of 50° C. would show even smaller losses at atmospheric temperatures, since increase in temperature tends to promote decomposition of aqueous polythionate solutions. In other words, this test procedure is an accelerated test procedure, in general solutions stable at 50° C. for about two weeks would be stable for at least six months at normal atmospheric temperatures.

*Example I*

Potassium pentathionate is dissolved in water to produce a solution having a concentration of the potassium pentathionate of about 2% by weight. Hydrochloric acid is added in amount to produce a solution having a pH of 2. To this solution is added 1 cc. of a normal solution of ferric chloride per liter of potassium pentathionate solution.

At the end of 14 days this solution tested as above described showed a decrease of only 3 millimols of potassium pentathionate per liter. The comparative sample which differed only in the absence of the ferric chloride subjected to the same test procedure showed a decrease of 7 millimols per liter.

*Example II*

Sodium tetrathionate is dissolved in distilled water to produce a solution having a concentration of about 2% by weight. Hydrochloric acid is added to this solution in amount so that its pH is 1.5. 2 cc. of a normal copper sulfate solution is added per liter of the resultant solution. The thus stabilized solution, upon subjecting it to the above test procedure, after 7 days showed a decrease of only 1.5 millimols of tetrathionate per liter.

*Example III*

To a 2% solution of sodium pentathionate in distilled water is added hydrochloric acid in amount to produce a solution having a pH of 1.5. To the resultant solution is added 1 cc. of normal ferric chloride solution per liter of solution.

This solution, after 14 days test above described, showed a decrease of only one millimol of pentathionate per liter.

*Example IV*

To a 2% by weight solution of potassium pentathionate in distilled water is added hydrochloric acid until it has a pH of 2. To the resultant solution 2 cc. of copper nitrate solution is added per liter of solution of potassium pentathionate.

Upon subjecting this solution to the above test it showed a loss of only 3 millimols of pentathionate per liter.

*Example V*

250 grams of potassium thiosulfate is dissolved in 350 cc. of water. To this solution is added 6 grams of arsenic trioxide dissolved in potassium hydroxide. The resultant solution is cooled to −10° C. 450 cc. of hydrochloric acid at a temperature of −10° C. is added to this solution. The resultant solution is agitated and permitted to stand at −10° C. for one hour and thereafter precipitated sediment is filtered off. The solution is then partially evaporated under vacuum. During the evaporation potassium chloride is precipitated and is removed. A yellow colored residue of about 100 cc. remains. Sodium or potassium carbonate is then added to precipitate the pentathionate as a sodium or potassium salt. The sodium and potassium pentathionate thus produced is dissolved in distilled water containing, if desired, up to 80% methanol or ethanol. To the resultant solution is added cupric acetate in amount of approximately 0.1% based on the weight of the pentathionate present. A stable solution results.

*Example VI*

A solution of tetra- and penta-thionic acid prepared, for example, according to the directions of Debus (Liebigs Ann. 244, page 76) is diluted with distilled water until the concentration of polythionic acids is 5%. Sodium bicarbonate is then added while stirring until the pH is about 1. The agitation may be conveniently carried out by bubbling filtered air through the solution. This effects removal of any sulfur dioxide which may be present. To the solution is added 0.18 gram cupric acetate per liter of solution. Should any precipitation take place, which will be evident by discoloration of the solution, the precipitate should be removed, for example, by filtration, and additional cupric acetate approximately in the same amount as previously added incorporated in the solution. The resultant solution contains the equivalent of 50 grams polythionic acid per liter of which approximately 65% is in the form of the sodium salts. It has a pH of approximately 1. It could be stored for years without change in its content of polythionates and without precipitation occurring.

A similar solution of sodium polythionates and containing polythionic acids prepared in the same way as in the above example, except it was free of cupric acetate, is found to be of uncertain stability. Upon standing in an open glass container a precipitation of from about 1 to 5 grams of sulfur per liter per month takes place at room temperature. If the glass container is closed, precipitation after a short initial period amounts to about 10 grams per week. At the end of 3 months the solution will contain crystalline sulfur, sulfuric acid, sulfur dioxide and traces of polythionic acids.

*Example VII*

680 grams of potassium polythionate containing approximately 28% potassium pentathionate and 69% potassium tetrathionate, the rest being potassium sulfate and potassium chloride, is dissolved in approximately 9500 cc. of water. 140 cc. of concentrated hydrochloric acid is added to this solution. 1.4 grams of cupric acetate is then added, and to the resultant solution is added enough water to form 10,000 cc. of solution. This solution is filtered. It has a pH of approximately 1.

It is stable when stored at room temperature and even at 100° F. for years.

A solution produced as described above but without the addition of cupric acetate thereto was stored in a closed bottle. Appreciable decomposition of this solution commenced in approximately one wheek.

Example VIII 680 grams of potassium polythionate having the same composition as in the preceding example is dissolved in approximately 4 liters of water. After addition of 0.01 gram of cupric acetate the solution is filtered and sufficient hydrochloric acid added to bring the pH to 3. Enough water is then added to produce 5000 cc. of solution. To this solution is added 5000 cc. of propylene glycol.

The resultant solution is stable when stored in closed flasks for years.

A solution produced as described above but without the addition of cupric acetate thereto was stored in a closed bottle. Appreciable decomposition of this solution commenced in approximately one week.

Example IX

A solution containing 12.5 grams of tetrathionic acid, 28.1 grams of pentathionic acid and 8.6 grams of hexathionic acid per liter of water is partially neutralized by the addition of sodium bicarbonate thereto until the resultant solution has a pH of 1. To this solution is added 1.5 grams cupric acetate per liter. This solution is then agitated by passing filtered air therethrough. This effects removal of any sulfur dioxide which may be present. Upon storage in bottles it remains stable at room temperature for years.

Without the cupric acetate a similar solution decomposes in a few weeks.

Example X

To a solution prepared as in Examples VI, VII or IX is added sodium or potassium carbonate or hydroxide until the pH is from 5 to 7. This solution remains stable for as long as 2 weeks and possibly as long as a month when the amount of alkali is added to produce a solution having a pH of 5. As the pH approaches 7, the solution becomes less stable. In general, however, the solution remains stable for a period long enough to permit its use for spraying trees or for other fungicidal purposes. Without the presence of the stabilizer, decomposition of the solution starts almost immediately upon the addition of the sodium or potassium carbonate or hydroxide, rendering it difficult, if not impossible, to use the solution for fungicidal purposes.

Example XI

To a 2% by weight solution of tetra- and penta-thionic acids in water having a pH of about .7, 0.13 gram of cupric acetate is added per liter. This solution when subjected to the above described testing procedure was stable during the 14 day period of the test.

Without the cupric acetate a similar solution of the same concentration of tetra- and penta-thionic acids showed appreciable signs of decomposition when subjected to the above described test in about 2 days time.

Ferric chloride or other cupric or ferric compounds may be incorporated in the solutions of the above examples to stabilize them instead of the stabilizers mentioned.

The stabilized solutions can be used not only for the purposes disclosed in the above examples, but also for cutaneous application and in the form of specially prepared stable solutions for medicinal uses. Stabilized solutions of the polythionates can also be employed for spraying plants to combat fungi and other microorganisms. The stabilized solutions having a pH of less than 5, preferably from 1 to 3, can be used for treating hair and skin and have the important advantage over other sulfur containing preparations that they do not stain the hair or skin and do not have or impart an objectionable odor.

In the claims the expression "aqueous solution" is intended to mean solutions in which water alone is used as the solvent, as well as solutions in which water alcohol mixtures containing up to 80% alcohol and water propylene glycol mixtures containing up to 50% propylene glycol are employed as the solvent.

As many changes could be made in the above process and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by United States Letters Patent is:

1. A process of stabilizing aqueous solutions of polythionate salts from the group consisting of alkali metal and alkaline earth metal salts of tetra-, penta- and hexathionates and mixtures thereof, said solution having a concentration of from 0.1% to 10% by weight of said salt, which comprises adding to said solution from 0.001% to 0.1% by weight based on the weight of the polythionates present of a compound from the group consisting of cupric and ferric acetates, formates, citrates and tartrates.

2. A process of stabilizing aqueous solutions of polythionate salts from the group consisting of alkali metal and alkaline earth metal salts of tetra-, penta- and hexathionates and mixtures thereof, said solution having a concentration of from 2% to 5% by weight of said salt, which comprises adding to said solution from 0.01% to 0.1% by weight based on the weight of the polythionates present, of a compound from the group consisting of cupric and ferric acetates, formates, citrates and tartrates.

3. A process of stabilizing dilute aqueous solutions of tetra-, penta- and hexa-thionic acids, mixtures of said acids, alkali metal salts of said acids, alkaline earth metal salts of said acids, said solution having a concentration of from 2% to 5% by weight, which comprises adding to said solution from 0.01% to 0.1% by weight based on the weight of the polythionates present of a compound from the group consisting of cupric and ferric organic acid salts of an acid from the group consisting of acetic, formic, citric and tartaric acids.

4. A stabilized aqueous solution of a compound from the group consisting of tetrathionic acid, pentathionic acid, hexathionic acid, mixtures of said acids, the alkali metal and alkaline earth metal salts of said acids and mixtures of said salts, said solution having a concentration of from 2% to 5% by weight of said compound and containing from 0.01% to 0.1% based on the weight of said compound of a metal compound from the group consisting of cupric and ferric organic acid salts of an acid from the group consisting of acetic, formic, citric and tartaric acids.

References Cited in the file of this patent

UNITED STATES PATENTS

| | | |
|---|---|---|
| Re. 23,711 | Neesby | Sept. 8, 1953 |
| 1,917,351 | Young | July 11, 1933 |
| 2,201,124 | Ekman | May 14, 1940 |
| 2,241,709 | Levy | May 13, 1941 |
| 2,439,720 | Crosley | Apr. 13, 1948 |
| 2,551,627 | Neesby | May 8, 1951 |

OTHER REFERENCES

Mellor: "A Comprehensive Treatise on Inorganic and Theoretical Chemistry," Longmans, Green and Co., New York, 1930, vol. 10, pages 490, 492, 497, 567, 612, 616, 617, 622, 623, 625, 626, 629.

Chemical Abstracts, vol. 37, page 6560 (1943), vol. 27, page 5018 (1933).